United States Patent
Springer, Jr. et al.

(10) Patent No.: US 7,136,866 B2
(45) Date of Patent: Nov. 14, 2006

(54) MEDIA IDENTIFIER REGISTRY

(75) Inventors: Thomas Brian Springer, Jr., Redmond, WA (US); Jason E. D. McCartney, Redmond, WA (US); Keith Maurice Toussaint, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 589 days.

(21) Appl. No.: 10/219,456

(22) Filed: Aug. 15, 2002

(65) Prior Publication Data

US 2004/0034650 A1 Feb. 19, 2004

(51) Int. Cl.
*G06F 17/30* (2006.01)
*G06F 15/16* (2006.01)

(52) U.S. Cl. .............. 707/102; 707/100; 709/219
(58) Field of Classification Search .............. 707/102; 704/270.1; 705/1; 709/102
See application file for complete search history.

(56) References Cited

U.S. PATENT DOCUMENTS

| | | | |
|---|---|---|---|
| 5,907,837 A | 5/1999 | Ferrel et al. | 705/14 |
| 5,924,090 A | 7/1999 | Krellenstein | |
| 5,946,680 A | 8/1999 | Shorter et al. | 707/3 |
| 6,263,341 B1 | 7/2001 | Smiley | |
| 6,343,295 B1 | 1/2002 | MacLeod et al. | 707/103 R |
| 6,345,256 B1 * | 2/2002 | Milsted et al. | 705/1 |
| 6,760,721 B1 | 7/2004 | Chasen et al. | |
| 6,865,573 B1 | 3/2005 | Hornick et al. | |
| 2002/0055942 A1 * | 5/2002 | Reynolds | 707/200 |
| 2002/0082837 A1 | 6/2002 | Pitman et al. | 704/270.1 |
| 2002/0161855 A1 * | 10/2002 | Manczak et al. | 709/219 |
| 2002/0174103 A1 | 11/2002 | Hsiao et al. | |
| 2003/0012549 A1 | 1/2003 | Ohnuma | |
| 2003/0093790 A1 | 5/2003 | Logan et al. | |

OTHER PUBLICATIONS

Kobayashi et al. "Information Retrieval on the Web," ACM Computing Surveys (CSUR), Jun. 2000, pp. 144-173, vol. 32, Issue 2, ACM Press, New York, U.S.A.

Rundensteiner et al., "Maintaining Data Warehouses Over Changing Information Sources," Communications of the ACM, Jun. 2000, pp. 57-62, vol. 43, Issue 6, ACM Press, New York, U.S.A.

* cited by examiner

*Primary Examiner*—Jeffrey Gaffin
*Assistant Examiner*—Hassan Mahmoudi
(74) *Attorney, Agent, or Firm*—Senniger Powers

(57) ABSTRACT

A media identifier registry for managing metadata records. The registry stores a unique logical identifier for each of the records as well as a base type corresponding to each of the logical identifiers. The base types are representative of the information contained in the respective metadata records for the corresponding logical identifiers. The registry further defines associations between the logical identifiers and base types. Improvements in identifying media content and related information according to the invention permit building a media data warehouse capable of aggregating data from many different sources, uniquely identify the same piece of content from different data providers, in different cultures, and in different physical forms to allow a consistent set of data to be stored and retrieved.

9 Claims, 5 Drawing Sheets

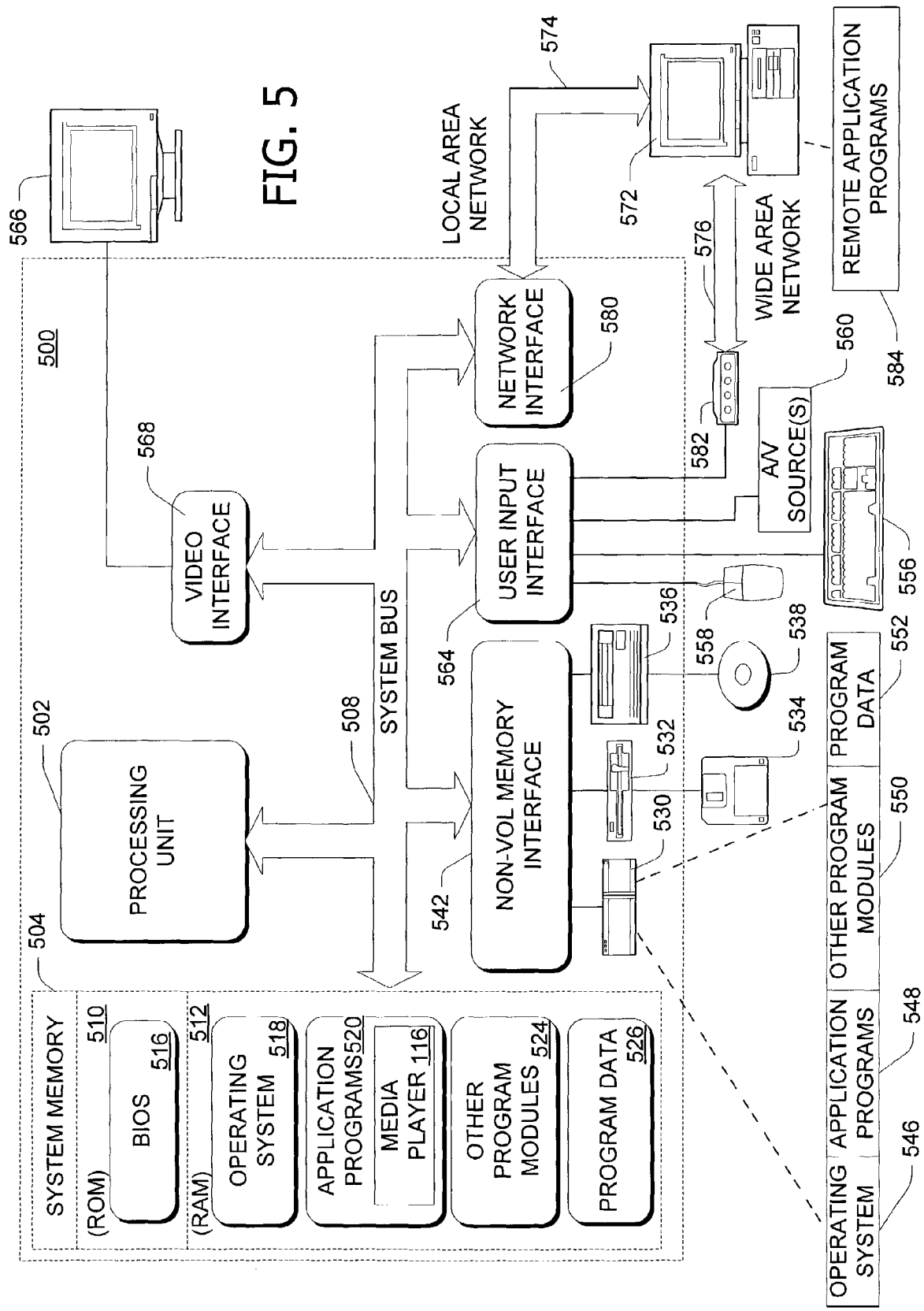

MEDIA IDENTIFIER REGISTRY

TECHNICAL FIELD

The present invention relates to the field of data management and publishing. In particular, this invention relates to an identification registry for use in storing, retrieving, aggregating, and associating identifiers to deliver data such as content-related media metadata.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

As users become more familiar with advanced features on their computers, such as those mentioned above, their expectations of the various additional innovative features will undoubtedly continue to grow. Users often desire to receive media metadata, which includes content-related data associated with digital media files such as those from CDs and DVDs. Independent data providers (IDPs), such as Loudeye Corporation and All Media Guide (AMG) of Alliance Entertainment Corp., capture a vast amount of information related to music CDs and other digital media. IDPs usually enter the collected data manually and store and manage the data using their own particular data entry application. Each IDP uses a different format for identifying content. Those skilled in the art are also familiar with media metadata services that collect information from users when metadata for a specific, requested media file is unavailable from an IDP. For example, consider a media player software application that enables a user to play a CD on his or her computer. Typically, the application allows the user to display track information associated with the CD by clicking on an appropriate user interface (UI). Such track information may include track number, song title, playing time, and the like.

The wide and varied tastes of computer users in music, movies, and the like create the need for an enormous corpus of metadata. As such, data publications of media metadata tend to be very large and experience a high volume of query traffic (e.g., several multi-gigabytes in size and under constant access). Also, the same logical content may have many different physical representations, which makes it difficult to identify and retrieve the correct media metadata for a specific media file. Moreover, the same piece of content from different data providers and/or in different cultures may be identified differently. These problems complicate the storage, management, and retrieval of media metadata, particularly in the context of a large database with data collected from multiple sources.

International Standard ISO 15707, published by the International Organization for Standardization (ISO) on Nov. 15, 2001, provides one scheme for identifying a logical piece of work. In general, ISO 15707 defines the format, administration, and rules for allocating an international standard musical work code (ISWC) to a musical work. The ISWC uniquely distinguishes one musical work from another within computer databases and related documentation for those involved in the administration of rights to musical works. The standard's goal is to reduce errors when information about musical works is exchanged between rights societies, publishers, record companies, and other interested parties on an international level. As defined in ISO 15707, the ISWC includes a prefix element followed by a nine-digit numeric code and a check digit. Unfortunately, this standard focuses on rights management rather than data management and aggregation and is limited in scope to musical works. Moreover, the existing standard does not provide for associating and mappings related identifiers, which is important when providing useful media metadata.

Those skilled in the art are also familiar with various tagging schemes for identifying digital content. For example, an ID3 tag residing at the end of an audio file can include title, artist, album, year, genre, track, and a comment field. In other words, known tagging systems embed data about the content directly in the content. The problem is that this metadata can become stale and even incorrect. While the ID3 standard provides for an identifier, it is merely a placeholder and there is no specification on how it is to be used. Moreover, existing tagging schemes also fail to address associations and mappings between identifiers.

Accordingly, this invention arose out of concerns for providing systems and methods for processing data to improve the breadth and quality of stored media metadata and, thus, improve the processing of media content to provide an enhanced, rich, and robust user experience. Improvements in identifying media content and related information, as well as in the techniques used to store, retrieve, aggregate, and associate identifiers is desired. Such improvements should permit building a media data warehouse capable of aggregating data from many different sources. In this regard, an identification system, or ID registry, is desired to uniquely identify the same piece of content from different data providers, in different cultures, and in different physical forms to allow a consistent set of data to be stored and retrieved.

SUMMARY OF THE INVENTION

The invention meets the above needs and overcomes one or more deficiencies in the prior art by providing improved management of metadata to enhance user experience when playing various media, including CDs and DVDs. Advantageously, the present invention improves how media content and related information are identified, as well as the techniques used to store, retrieve, aggregate, and associate identifiers. Systems and methods of the invention permit building a media data warehouse capable of aggregating data from many different sources. In this regard, an identification system uniquely identifies the same piece of content from different data providers, in different cultures, and in different physical forms to allow a consistent set of data to be stored and retrieved. The invention handles data about media content and authors without being bound to the physical or cultural representation of the data or to any of a number of incomplete or proprietary identification systems. The invention also enables a single logical identifier to be embedded in digital media content for use in retrieving metadata about the content. The identifier, which is independent of the physical media, can also be used to map other identification systems that are based on the physical properties of the media. This permits returning consistent data for different physical renderings of the same logical piece of content based on a mapping to the unique logical identifier. Moreover, the features of the present invention described herein are less laborious and easier to implement than currently available techniques as well as being economically feasible and commercially practical.

Briefly described, a method of managing metadata embodying aspects of the invention includes maintaining a database of metadata records. The metadata records each correspond to one or more media files and contain information relating to content of the corresponding media files. The media files are adapted for rendering by a media player program executed on one or more client computers. The method also includes generating a unique logical identifier for each of the metadata records. In this instance, the logical identifiers are configured for use in querying the metadata database. The method continues with defining a base type corresponding to each of the logical identifiers. The base types are representative of the information contained in the respective metadata records for the corresponding logical identifiers. The method also includes storing the logical identifiers and the base types in an ID registry and defining associations between them.

Another embodiment of the invention is directed to a system for managing metadata, which includes a server coupled to a data communications network and a database of metadata records. The metadata records each correspond to one or more media files and contain information relating to content of the corresponding media files. The media files are adapted for rendering by a media player program executed on one or more client computers, which are also coupled to the data communications network. An ID registry stores a unique logical identifier for each of the metadata records. In this instance, the logical identifiers being configured for use by the server in querying the metadata database. The ID registry further stores a base type corresponding to each of the logical identifiers and associated therewith in the ID registry. The base types are representative of the information contained in the respective metadata records for the corresponding logical identifiers.

In another embodiment, a data structure according to the invention has a first field containing unique logical identifiers and a second field containing base types associated with the logical identifiers. The logical identifiers correspond to a metadata record, which correspond to media files. The metadata records contain information relating to content of the corresponding media files. The base types each corresponding to one of the logical identifiers. In this instance, the base types are representative of the information contained in the respective metadata records for the corresponding logical identifiers.

Computer-readable media having computer-executable instructions for performing methods of managing metadata embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 5 is a block diagram illustrating one example of a suitable computing system environment on which the invention may be implemented.

Corresponding reference characters indicate corresponding parts throughout the drawings.

DETAILED DESCRIPTION OF THE INVENTION

Figure 1:
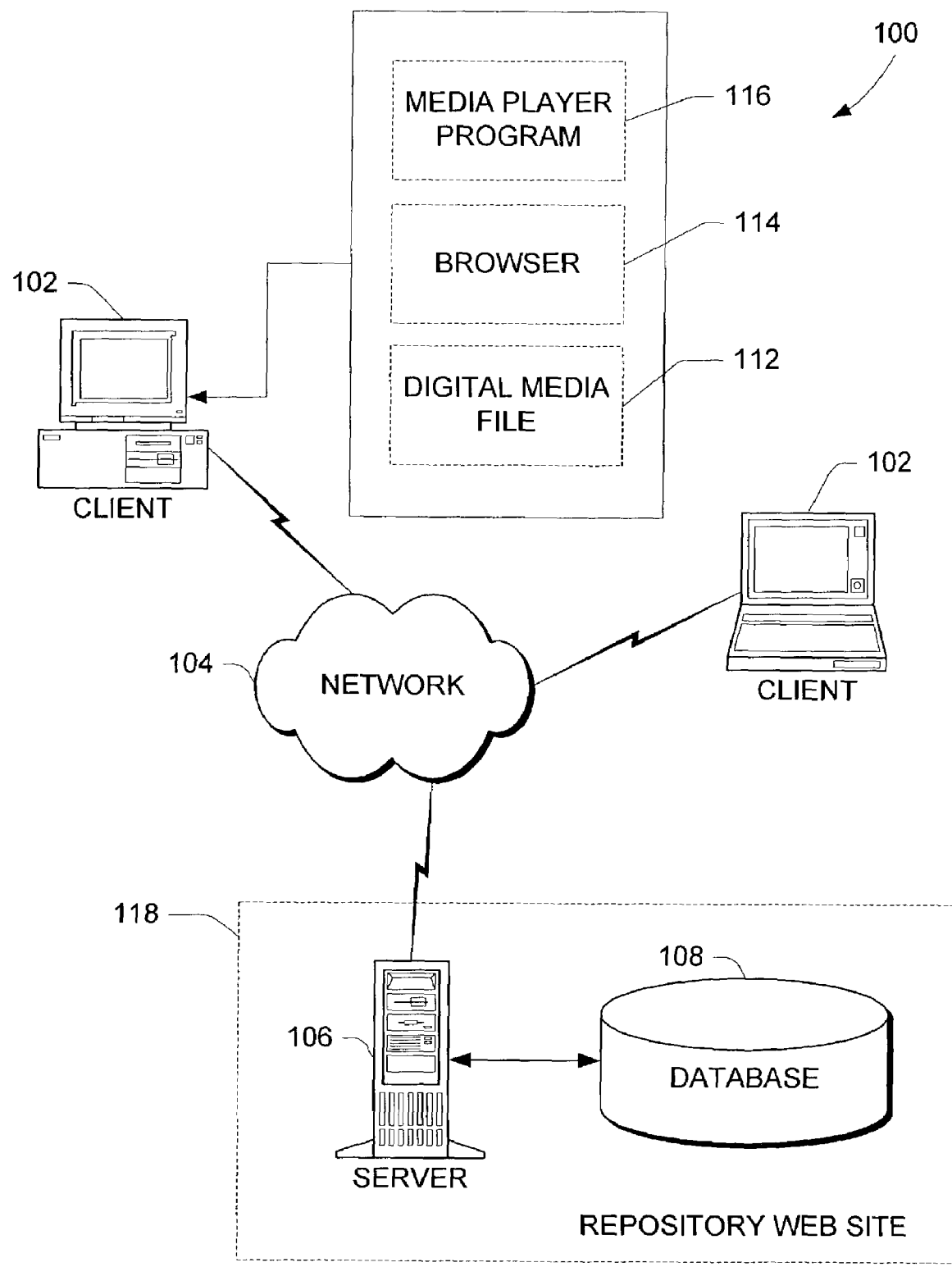
FIG. 1 is a block diagram of a computer system embodying aspects of the present invention.

Referring now to the drawings, FIG. 1 illustrates an exemplary network environment in which the present invention can be used. A system 100 has one or more client computers 102 coupled to a data communication network 104. One or more server computers 106, sometimes referred to as "web servers" or "network servers," are also coupled to the network 104. In turn, the client computer 102 can access the server 106 via network 104. As shown in FIG. 1, the system 100 also includes one or more databases 108 associated with server 106.

In this example, network 104 is the Internet (or the World Wide Web). However, the teachings of the present invention can be applied to any data communication network. Server 106 and client computer 102 communicate in the illustrated embodiment using the hypertext transfer protocol (HTTP), a protocol commonly used on the Internet to exchange information.

Referring further to FIG. 1, the user's computer 102 accesses a digital media file 112, such as one residing on a compact disc or other suitable computer storage media. Client computer 102 also executes a web browser 114 and a media player application program 116. In this embodiment, server 106 and its associated database 108 form a repository web site 118 with which computer 102 communicates via network 104 to access data stored in database 108. The media player program 116 can be any suitable rendering filter or media player that is configured to play digital media so that a user can experience the content that is embodied on the media. For example, suitable media player applications include a CD media player application and a DVD media player application.

One aspect of the present invention enables the user or, particularly, enables media player program 116 executed on a computing device or client, to access, retrieve, and display for the user, so-called metadata. Those skilled in the art are familiar with metadata, which is simply information about data. In the context of the present invention, metadata involves information related to specific content of digital media file 112 being played on the media player 116. Basic metadata includes title, composer, performer, genre, description of content, and the like. Extended metadata includes cover art, performer biographies, reviews, related performers, where to buy similar items, upcoming concerts, ticket sales, URLs to other related experiences including purchase opportunities, and the like.

In the embodiment of FIG. 1, server 106 matches the metadata stored in database 108 to the specific media content that is being experienced by the user. Server 106 then returns the metadata to the user's computer 102. It is to be understood that FIG. 1 presents a simplified illustration of the relationship between computer 102, server 106, and database 108. Aspects of the invention involving this relationship between the components will be described in greater detail below.

In the examples herein, the media content of digital media file 112 is described in the context of content embodied on a CD or a DVD. It is to be appreciated and understood that the media content can be embodied on any suitable media, including digital files downloaded to the client computer's memory, and that the specific examples described herein are given to further understanding of the inventive principles. For convenience, digital media file 112 refers to one or more files representing, for example, a single song track or a collection of tracks such as would be found on an audio CD. The media content can include, without limitation, specially encoded media content in the form of, for example, an encoded media file such as media content encoded in Microsoft® Windows Media™ format using the Microsoft® Windows Media™ Player program.

The resultant system 100 permits the user to play media file 112 on an enabled media-playing device (e.g., computer 102 running Microsoft® Windows® operating system and Windows Media™ Player) and expect not only to experience the media content but also have access to all manner of related metadata. In addition, the user community has the ability to contribute key information to the process to improve the experience for other users.

In the exemplary embodiment of FIG. 1, a web service (i.e., repository web site 118) provides data about music CDs and the like to media player application 116. Each time a user plays a CD, for example, in the media player, the media player contacts the web service to see what CD information (e.g., title, artist, cover art, track names, etc.) is available. On the back-end, the web service aggregates CD data from a number of different sources, including the user community. The data feeds vary periodically (e.g., daily). The process of collecting metadata is explained below in connection to FIG. 2. In this example, the web service publishes new CD information from different sources every day.

The present invention provides improved management of metadata to enhance user experience when playing media file 112. In one embodiment, the invention permits building a media data warehouse capable of aggregating data from many different sources. In this regard, an identifier (ID) registry uniquely identifies the same piece of content from different data providers, in different cultures (including different languages), and in different physical forms to allow a consistent set of data to be stored and retrieved. This ID registry handles data about media content and authors without being bound to the physical or cultural representation of the data or to any of a number of incomplete or proprietary identification systems. The invention enables a single logical identifier to be embedded in digital media content for use in retrieving metadata about the content. According to the invention, the identifier is independent of the physical media and can be used to map other identification systems that are based on the physical properties of the media. This permits returning consistent data for different physical renderings of the same logical piece of content based on a mapping to the unique logical identifier.

Figure 2:
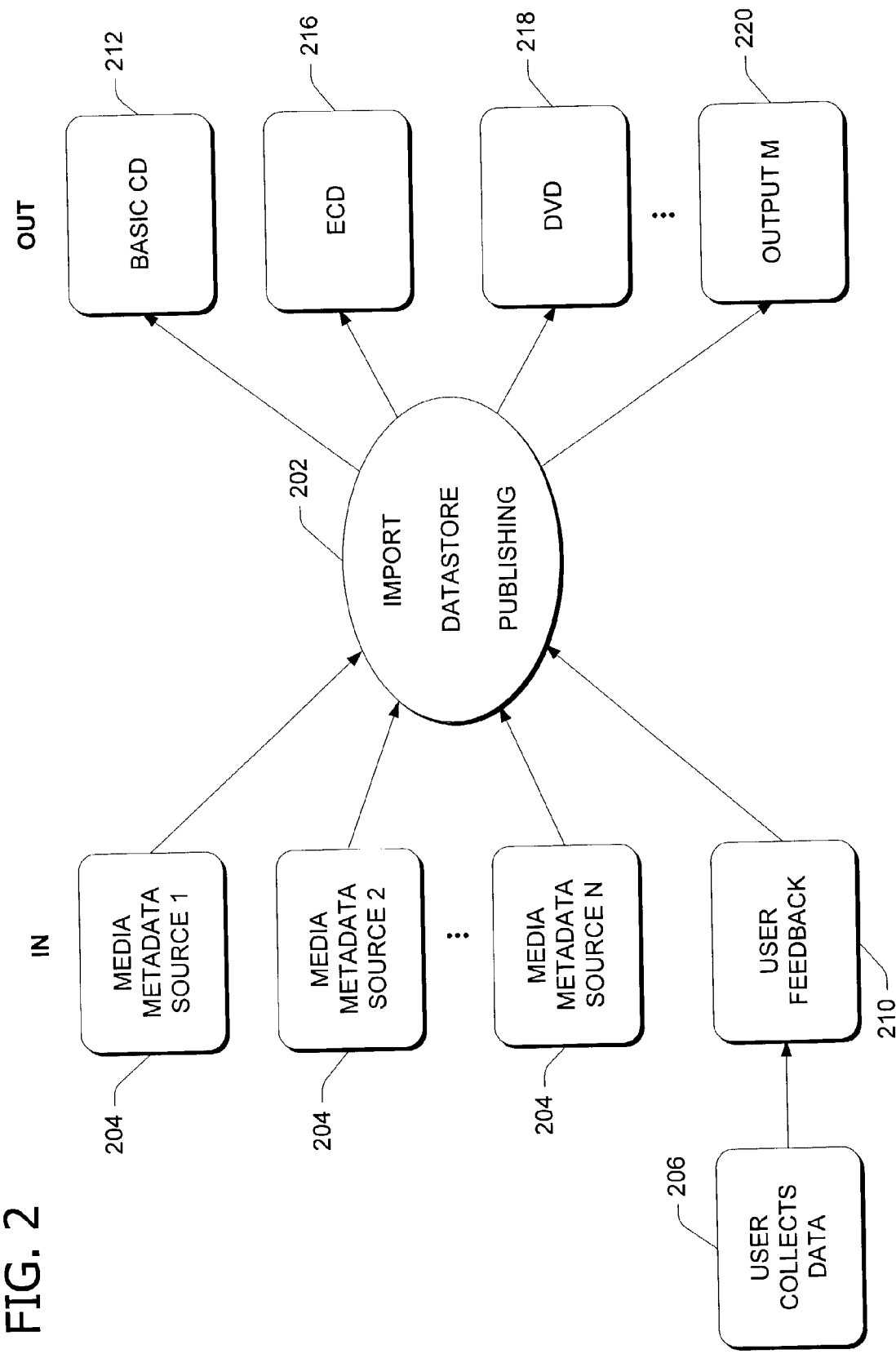
FIG. 2 is a block diagram illustrating aspects of metadata publishing by the system of FIG. 1.

Referring now to FIG. 2, one embodiment of repository web site 118 provides import, datastore, and publishing functions at 202. Typically, known independent data providers 204 of media metadata (e.g., Loudeye, AMG, and Oricon) supply the repository with trusted information, that is, source data. In this instance, each IDP 204 specializes in the gathering and management of media metadata and licenses the data to system 100. Due to the trusted nature of the source, this data is treated as "canonical." As an example, popular albums that have been released for many years tend to have well-established metadata.

In FIG. 2, the user gathers content-related media data directly from a CD, for example, at 206 and then submits the information at 210. System 100 publishes metadata in several formats. As shown at 212, published metadata takes the form of basic CD information. System 100 can also publish the data in extended CD format at 216 and/or DVD format at 218. As indicated at 220, the present invention contemplates other types of data output.

The present invention beneficially scales well to multiple data providers 204. While basic metadata for each digital media type (e.g., CD, DVD) can be considered universal because they are tied to the data standards in the media, extended metadata varies widely among multiple data providers. Many data publishers require full updates of metadata on a regular basis. Thus, the use of conventional tagging schemes and the like is problematic.

When the user accesses ("rips") an audio track from a specific digital medium, the ripped track (i.e., digital media file 112) is stored on local storage media associated with the user's computer, such as client computer 102 in FIG. 1 (see also computer 500 in FIG. 5). If client computer 102 is connected to network 104, as described with reference to FIG. 1 and FIG. 5, media player program 116 executing on computer 102 sends an identifier for digital media file 112 to server 106 of repository web site 118 via network 104. As described below, the ID may take the form of a physical identifier. Repository web site 118 has access to database 108. In response to the received ID, for example, server 106 transmits metadata associated with the identified media file 112 to the user's computer 102.

In one embodiment, each media file 112 (in which the content that is to be experienced by the user resides) has a physical ID associated therewith. The invention assigns or otherwise associates the physical ID with a unique logical ID in an ID registry, which it then uses as the basis for any database queries. With respect to the physical IDs that are associated with the media, any suitable method or technique of generating a physical ID can be used. For example, when a user inserts a piece of media into a properly configured and enabled device, software code can execute and read data from the physical media. The software code can then compose a unique or nearly unique physical ID from that data.

In the case where the media comprises a CD, the identifier may take the form of a physical ID such as a table of contents (TOC) identifying the specific digital media file 112 based on the offsets of each track on the disc. Software code can read the offsets (in frames, which have a resolution of $\frac{1}{72}^{nd}$ of a second) of each track on the disc. A composite key or physical ID is then built from a string of the hex values of these offsets, prefaced by a number of tracks on the disc and finished with a representation of the total length of the disc. The TOC, defined by a well-known specification referred to as the Red Book, identifies an audio CD based on absolute times for the start of each track. In general, the TOC is implicitly computed based on the offsets of each track and is expected to be the same for all like-entitled CDs published from the same source (in certain instances, the TOC may also be found in the CD's lead-in area).

In the case where the media comprises a DVD, software code can read the first 64 kilobytes of two files that are found on every DVD. These files are VIDEO_TS.IFO and VTS_01_0.IFO. The former contains main-menu information (VMGI), and the latter contains title set information (VTSI) for the first title on the DVD. After the appropriate data blocks are read, the code generates a 64-bit CRC (cyclic redundancy code) checksum of the data, resulting in an appropriately unique key or physical ID.

Of course, it is to be understood that the above two examples are simply two ways that a physical ID can be generated for two different types of media. Other methods of generating physical IDs, such as an International Standard Recording Code (ISRC) or an audio fingerprint or digital watermark for a pulse code modulation (PCM) stream, as well as other media types can be employed. In general, the physical IDs are computed media identifiers.

The client computer 102 executes software code in this example to calculate the physical IDs on the client side. In one embodiment, such code comprises part of a software-implemented media player (e.g., media player program 116) that is configured to play the media of interest. Once client computer 102 generates the physical IDs, it sends them to server 106 of the repository web site 118 via network 104 using a suitable protocol. The server 106 then uses the physical ID in connection with an ID registry system that, as described in detail below, uniquely identifies the same piece of content from different data providers, in different cultures, and in different physical forms to allow a consistent set of data to be stored and retrieved. The ID registry handles data about media content and authors without being bound to the physical or cultural representation of the data or to any of a number of incomplete or proprietary identification systems used by various IDPs. The invention enables a single logical ID for use in retrieving metadata about the content of digital media file 112. This unique identifier, which is independent of the physical media, can also be used to map other identification systems that are based on the physical properties of the media. As such, system 100 can return consistent metadata for different physical renderings of the same logical piece of content based on a mapping to the unique logical identifier.

Various features of the described systems and methods include a set of databases, client side executable code, and a series of server side processes that provide for querying and maintaining the databases. One logical organization of exemplary system 100 includes a process to define a unique logical ID for digital media file 112 in an ID registry and to map the unique ID to various pieces of physical media, other identifiers for the same content, and the like. This organization also includes a query process to retrieve information from database 108 based on the unique ID.

In system 100, the user on the client side inserts the media into computer 102, or otherwise causes the content of media file 112 to be experienced. As described above, computer 102 uses a physical ID identifying specific media file 112 to access the logical ID that uniquely identifies the media. Server 106 then uses the logical ID in the ID registry as the basis for metadata queries of database 108. These queries are designed to retrieve a rich set of related metadata for the user. Server 106 then returns the metadata to client computer 102 via network 104 for display to the user.

Figure 3:
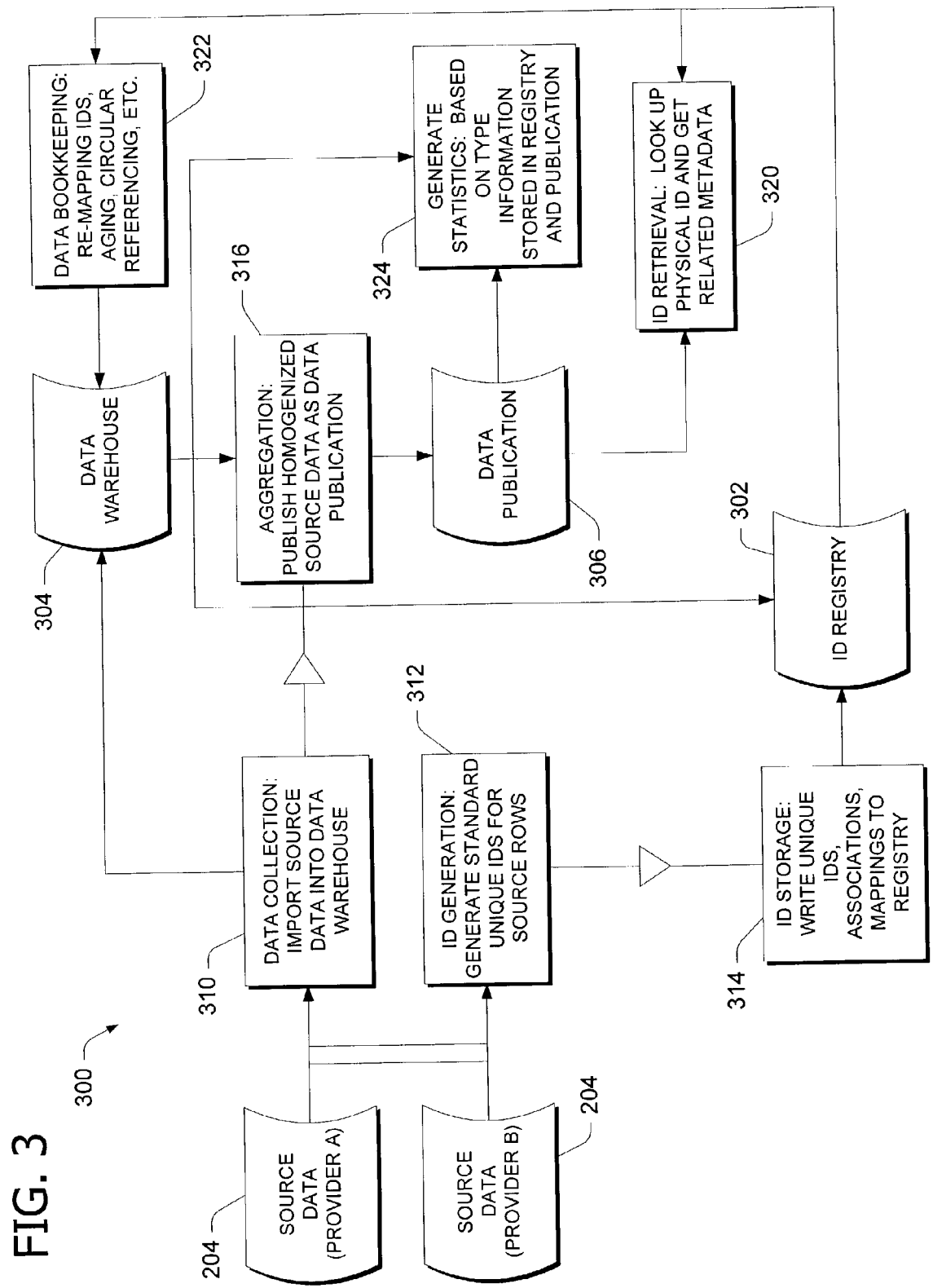
FIG. 3 is an exemplary flow diagram illustrating aspects of the operation of the system of FIG. 1.

With reference to FIG. 3, the present invention involves an identification system 300 for media content and content-related information, as well as methods of storing, retrieving, aggregating, and associating identifiers. FIG. 3 illustrates one embodiment of the invention by way of a process flow diagram. In this instance, an ID registry 302 uses a database schema (see FIG. 4) and a set of functions and procedures for storing, retrieving, and maintaining relationships in the schema to implement the invention. The registry 302 acts as a fundamental building block of a media data warehouse 304 capable of aggregating data from many different sources, such as IDPs 204 or user feedback (not shown in FIG. 3).

The goal of the identification system 300 and, particularly, ID registry 302, is to uniquely identify the same piece of content from different data providers, in different cultures, and in different physical forms. For example, different IDPs use different formats for their identifiers so the same content may be identified by a number of different identifiers. Also, performers often use different stage names at different points in their careers and the same song may be found in a number of different physical forms, such as a CD track, MP3 file, etc. System 300 beneficially stores a consistent set of media-related data in a data publication 306 that integrates data from many different sources and from many different cultures. The use of ID registry 302 according to the invention also allows system 300 to consistently retrieve the data when presented with information about the physical format and unique characteristics of media file 112.

Beginning at 310 and 312, a computer such as server 106 processes source data (e.g., content-related metadata for a plurality of digital media files 112) from one or more data providers 204. At 310, system 300 imports the source data into the data warehouse 306 and, at 312, system 300 generates standardized, unique, logical IDs for source rows of data. For example, system 300 generates unique Ids for artist/performer, albums, tracks, etc. Process flow in FIG. 3 continues to one or more processes 314 for performing ID storage functions and one or more processes 316 for performing data aggregation functions.

Figure 4:
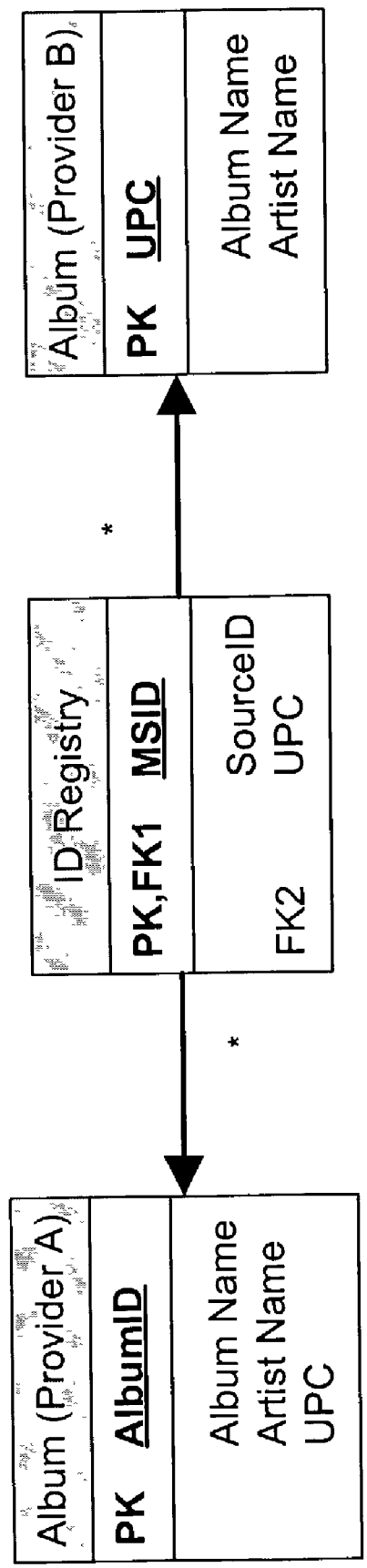
FIG. 4 is an exemplary embodiment of a data schema in accordance with the present invention.

At 314, server 106 writes the unique logical IDs generated at 312, as well as associations and mappings with various other identifiers, to ID registry 302 (see database schema of FIG. 4). As described above, identification system 300 provides one common ID space, i.e., registry 302. This allows system 300 to store and retrieve IDs (see ID retrieval at 320) using a single data type regardless of the characteristics of the data referred to by a particular unique logical ID. Using a common data type in this manner further allows a number of relationships (i.e., associations and mappings) between IDs to be stored using a common schema (described in greater detail below). In one embodiment, the invention abstracts the unique logical identifier from any one of a number of possible identifiers used to represent the physical media itself. Thus, the unique ID stored in registry 302 is actually a logical identifier for digital media file 112. Various different physical media identifiers, such as a TOC and track number for a CD, an ISRC, or an audio fingerprint or digital watermark for a PCM stream can all be mapped to the same unique logical identifier.

The system 300 also maps non-homogenous identifiers of different data types and formats from various IDPs 204 into the common ID space of registry 302. ID registry 302 maintains status information about the various identifiers, such as whether the data provider 204 has discontinued a particular identifier or replaced it with another identifier. This, again, provides a layer of abstraction between different data representations of media file 112 across multiple data providers 204. According to the invention, the unique logical identifier can also be embedded in digital content to provide a link back to ID registry 302. This means that data about the digital content of media file 112 can be maintained, updated, corrected, and enhanced in a central place and can be requested again at any time.

Process flow continues from the data collection functions at 310 to the aggregation functions at 316. In this instance, server 106 utilizes the common ID space of registry 302 to publish the source data from data warehouse 304 as a homogenized (i.e., aggregated) data publication 306. In this regard, the present invention uniquely identifies the same piece of content from different data providers, in different cultures, and in different physical forms using a single, unique, logical ID. System 300 allows a consistent set of metadata to be stored in data publication 306 at 316 and then retrieved at 320 based on, for example, the unique logical ID associated with the physical ID of media file 112.

In addition, the illustrated embodiment of FIG. 3 performs various bookkeeping functions at 322 to maintain integrity and consistency of the ID system as a whole. The bookkeeping functions remove IDs from registry 302 when they no longer refer to anything and re-map the corresponding information to other unique logical IDs. These functions at 322 also protect against circular references and the like. At 324, this embodiment of the invention also tracks IDs based on their type and generates statistics based on data publication 306 and the type information stored in registry 302.

Referring further to the processes illustrated in FIG. 3, ID registry 302 is embodied by a database schema that tracks each logical ID in the schema, and its type, when it was created. The logical ID itself is a globally unique identifier (GUID), for example. In general, a GUID is a 128-bit value known by those skilled in the art to be unique. At 312, server 106 generates the unique logical ID using a presently available GUID function (e.g., the newid( ) function of the Microsoft® SQL Server™ database server application). In turn, the newid( ) function uses an application programming interface such as CoCreateGUID( ) to create the GUID. For simplicity, the foregoing describes server 106 as creating the logical ID. However, it is to be understood that the use of a GUID as the data type for IDs in the present invention means that several autonomous systems can be used to generate logical IDs without risk of creating duplicates. In other words, the invention advantageously permits creation of logical IDs in a federated manner. This is a useful property for improving the scalability of ID generation. Also, the use of GUIDs relieves the overhead of checking to see if an ID has already been used or pulling from a central pool of known new IDs.

In one embodiment of the invention, the logical IDs of registry 302 do not contain any type information. Thus, the invention eliminates the risk of partitioning the ID space and running out of useable IDs. The core registry table, ID registry 302, associates each logical ID with its type. For example, the type is a bit field used to describe the logical ID. Each logical ID in this embodiment has a base type (e.g., a piece of content, a collection of content, or a content author or performer). The "type" indicates to what type of information the logical ID refers. Each type can be further specified to the extent that each unique type can still be represented as a unique bit field. So, the specificity of the type system is only constrained by the size of the bit field.

Having a single underlying data type while storing semantic type information separately for all logical IDs written to ID registry 302 permits functions and interfaces to be written generally. For example, a generalized web service can look up a unique logical ID for a specific media file 112 and return a type specific extensible markup language (XML) document based on the ID's type passed as input. Another generalized web service can take a logical ID as input and return all of the media-related content associated with the particular logical ID, whether it is an identifier for a CD, DVD, or other collection of content.

The invention further contemplates the use of type information stored in registry 302 when a more strongly typed interface is required. In one instance, a web service can verify artist information by checking that the logical ID passed as input has a base type of "artist." The ID retrieval process 320 quickly checks for a specific type by a "bookmarked" retrieval of the ID from registry 302 and a check for the specific bits required in the identifier's type bit field. In the alternative, if a table or view exists containing all IDs of a specific type, such as artists, system 300 permits retrieval of information about the artist from the table. This allows for both a check of the existence of the logical ID of the particular type and retrieval of domain data about the logical ID at the same time. In this alternative embodiment, a domain table contains domain data for all logical IDs of the specific type.

Referring further to FIG. 3, registry 302 also associates logical IDs with other IDs. At ID storage stage 314, server 106 writes such associations to ID registry 302. Associations are useful for indicating when one thing is like another but not the same. A generalized collection table, for example, represents a basic association. The collection has a simple schema containing a collection ID, an element ID, and an ordinal value. The schema in this embodiment permits ordered collections to be represented. Ordered collections occur commonly in connection with media metadata and can be used to represent things like tracks on a CD, menu and chapter information on a DVD, individual media in a box set, or a radio play list. The flexibility of a common base data type for all IDs allows this collection table to be used in a general way.

Another important type of collection held in a separate schema is a temporal collection, rather than just an ordered collection. This schema is important for describing a collection that only exists for a certain period of time. For example, a band and its members is a temporal collection. Inasmuch as a band is really an entity unto itself and yet comprised of individual members, each band receives a separate identifier as a separate logical entity to be associated with content.

Another important relationship is between people, or collections of people, and content. This type-based association includes things like authors, composers, directors, and performers and how they related to the content of one or more media files 112. System 300 associates a person logical ID with a content logical ID. Again, a bit field describes the role of the person with respect to the content. Thus, system 300 easily associates a single person once with a piece of content and then "ANDs" the bit field with the correct bits for various other types. This allows the same person to have an association type that indicates producer, director, writer and actor for a given piece of content.

Any number of different associations can be contained in the common schema of system 300 due to the choice of a single data type for the unique media logical identifier. One immediate benefit of the generic hierarchical nature of the associations is that a status that is applied at the root level can easily be applied at all levels below.

At 314, server 106 also writes mappings to ID registry 302 in addition to associations. Mapping the unique logical identifier assigned to a particular media file 112 to other ID domains is a core function of registry 302 and most of the current processes built in and around registry 302 are used to maintain these mappings. The two main areas of mapping are a) mapping a unique logical identifier to one or more IDs in other data providers' ID systems; and b) mapping a unique logical identifier to one or more physical identifiers. Mappings are useful for indicating when disparate things are really the same. System 300 implements mappings using a unique schema each time a logical ID needs to be mapped to a different data type or a different number of columns. For example, system 300 maps GUIDs (i.e., the logical IDs) to other information, such as source IDs and domain IDs. In one embodiment, source IDs identify media file 112 using the identifier convention of a particular IDP 204 or the file's physical ID and domain IDs indicate whether the data is CD, DVD, or another type of digital media data.

In one embodiment, a single table maps IDs from other data providers 204 to the unique logical identifiers of registry 302. The schema (see FIG. 4) has a column for the unique logical identifier, another column for the provider's ID and yet another column for the bit field corresponding to the type of the provider's ID. System 300 uses the type to construct more and more detailed types by adding bits. For instance, a simple check can be used to identify all IDs from a given provider 204, then all IDs about music from provider 204 and finally all IDs about CD tracks from the given provider 204. A single unique logical identifier can be mapped to many IDs from different IDPs 204. This is part of the power of the unique logical identifier system 300.

The provider-type ID currently uses a variable length string of up to 100 unicode characters. The length has proved flexible enough to accommodate several IDPs 204. For example, numeric identifiers, such as those used by certain IDPs 204, can easily be converted to character data. In cases where data provider 204 does not maintain a unique identifier for data, system 300 can usually construct one from a group of fields considered to be unique. Thus, one logical identifier in a common ID space (i.e., registry 302) can be used to map into different provider ID systems. Each IDP 204 may provide data in very different schema covering different elements about the same piece of content. Similarly, the data can also be provided in many different languages and culturally specific ways. As long as the data relates to the same logical piece of content of media file 112, system 300 relates it using a single, unique, logical identifier, which can also be associated with various physical recordings or representations of the content.

In one embodiment, multiple schemas store different physical IDs mapped to the unique logical identifiers of registry 302. This is based mainly on the widely different physical identifiers used for different types of media. For instance, CDs can consume up to 600 characters to uniquely identify a disc, using the standard TOC method. DVDs use a proprietary Microsoft identifier that consumes only 16 characters. As such, system 300 stores the mappings for these in separate schema. As other fingerprinting, watermarking and ISRC-based technologies become available to identify digital content, system 300 can similarly map the identifiers into ID registry 302.

Referring now to the bookkeeping processes at 322, the present invention maintains integrity and consistency of the ID system 300 as a whole by these data back end operations. The bookkeeping processes handle statuses for IDs that no longer refer to anything. For instance, if data provider 204 deletes a particular ID from its ID system, ID registry 302 can keep track of when the unique logical IDs no longer refer to useful data. This is important because the identifier could be embedded in a piece of content. If so, it would need to be flagged and re-mapped to another unique logical ID in system 300 that has data available. In the alternative, the data needs to be acquired through an editorial process.

The system 300 further ensures that one unique data provider ID or physical ID is only mapped to one single unique identifier through data constraints to prevent circular references in the collection relationships. System 300 also maintains other type-based integrity for important ID relationships. For example, a piece of content should never refer to a collection that does not exist and track information should never refer to an album that does not exist. Conversely, all content should have at least one performer associated with it. In one embodiment, the invention implements these rules as database triggers to maintain consistency at the time the logical IDs are stored in registry 302.

Advantageously, system 300 enables a single logical ID to be embedded in digital media content and/or collections of digital media content and used to retrieve metadata about the media. The logical identifier can also be used to map other ID systems that are based on, for example, physical properties of the media file 112. Inasmuch as the logical identifier is independent of the physical media, a digital music file or a CD track or an audio stream can all be used to retrieve the same logical identifier from ID registry 302, presuming they all share the same metadata. In other words, system 300 returns consistent data for different physical renderings of the same logical piece of content return consistent data based on the unique logical identifier to which the physical IDs are mapped.

Referring now to FIG. 4, the present invention further provides an improved data schema for implementing ID registry 302. In FIG. 4, PK refers to Primary Key, FK refers to Foreign Key, AK refers to Alternate Key, U refers to Unique, and I refers to Index. In addition, the cardinality of the relationships among tables in the user feedback data schema is indicated as follows: One to Many (1 . . . *); One to One (1 . . . 1); and Zero or More (*).

The exemplary schema of FIG. 4 includes an Album table for at least two data providers 204 for purposes of illustration. In this instance, the Provider A data makes reference to an AlbumID primary key and the Provider B data makes reference to a UPC (universal product code) primary key. Both Album primary keys are associated with the unique logical identifier MSID in the ID Registry table. As described above, each MSID has a base type to identify to what the identifier refers. In this example, the base type is "album."

The present invention enables an essential service, namely, linking a general metadata experience with a purchase opportunity, or "buy" experience. In this instance, the information used to determine whether a particular item is available for purchase is not included in the source data for Provider A. However, there is a unique logical ID in registry 302 that is common between the general purpose data and an external data source that holds specific information as to whether an item is available for purchase (i.e., source data from provider B). Given these two disparate data sources, system 300 uses the ID registry 302 to make a positive match between the information and provide a seamless user experience.

In this specific example, among the attributes of an album is the UPC. While this is included in the general purpose database, it is not intended to indicate anything relative to the product's availability. A separate database that includes a more up-to-date UPC list is also included in the ID registry 302. Based on this data, system 300 can build a "buy" experience that incorporates current sales availability information.

FIG. 5 shows one example of a general purpose computing device in the form of a computer 500. In one embodiment of the invention, a computer such as the computer 500 is suitable for use in executing media player program 116 (i.e., client computer 102). Likewise, computer 500 is suitable for use as server 106.

In the illustrated embodiment, computer 500 has one or more processors or processing units 502 and a system memory 504. A system bus 508 couples various system components including the system memory 504 to the processors 502. The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 has at least some form of computer readable media in FIG. 5. Computer readable media may be any available medium that can be accessed locally or remotely by computer 500. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 500. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 504 includes computer storage media in the form of removable and/or non-removable, volatile and/or nonvolatile memory. In the illustrated embodiment, system memory 504 includes read only memory (ROM) 510 and random access memory (RAM) 512. A basic input/output system 516 (BIOS), containing the basic routines that help to transfer information between elements within computer 500, such as during startup, is typically stored in ROM 510. The RAM 512 typically contains data and/or program modules that are immediately accessible to and/or presently being operated on by processing unit 502. By way of example, and not limitation, FIG. 5 illustrates operating system 518, application programs 520 (e.g., media player 116), other program modules 524, and program data 526.

The computer 500 may also include other removable/non-removable, volatile/nonvolatile computer storage media. For example, FIG. 5 illustrates a hard disk drive 530 that reads from or writes to non-removable, nonvolatile magnetic media. FIG. 5 also shows a magnetic disk drive 532 that reads from or writes to a removable, nonvolatile magnetic disk 534, and an optical disk drive 536 that reads from or writes to a removable, nonvolatile optical disk 538 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 530, and magnetic disk drive 532 and optical disk drive 536 are typically connected to the system bus 508 by a non-volatile memory interface, such as interface 542.

The drives or other mass storage devices and their associated computer storage media discussed above and illustrated in FIG. 5, provide storage of computer readable instructions, data structures, program modules and other data for the computer 500. In FIG. 5, for example, hard disk drive 530 stores operating system 546, application programs 548, other program modules 550, and program data 552. Note that these components can either be the same as or different from operating system 518, application programs 520, other program modules 524, and program data 526. Operating system 546, application programs 548, other program modules 550, and program data 552 are given different numbers here to illustrate that, at a minimum, they are different copies.

For purposes of illustration, programs and other executable program components, such as the operating system 518, 546, are illustrated herein as discrete blocks. It is recognized, however, that such programs and components reside at various times in different storage components of the computer, and are executed by the data processor(s) of the computer. For example, FIG. 5 shows media player 116 stored in system memory 504. Those skilled in the art understand that components of media player 116 may reside in system memory 504, hard disk drive 530, or both.

Referring further to FIG. 5, a user may enter commands and information into computer 500 through input devices such as a keyboard 556 and a pointing device 558 (e.g., a mouse, trackball, pen, or touch pad). Other input devices known in the art include an audio/video input device(s) 560 as well as a microphone, joystick, game pad, satellite dish, scanner, or the like (not shown). These and other input devices are connected to processing unit 502 through a user input interface 564 that is coupled to system bus 508, but may be connected by other interface and bus structures, such as a parallel port, game port, or a universal serial bus (USB). As is well known in the art, application programs 520, 548 are often configured to present a user interface (UI). The UI allows a user to interact with the application program in some manner using some type of input device (e.g., keyboard 556 or pointing device 558). This UI is typically a visual display that is capable of receiving user input and processing that user input in some way. By way of example, the UI presents one or more buttons or controls that can be clicked on by a user.

A monitor 566 or other type of display device is also connected to system bus 508 via an interface, such as a video interface 568. In addition to the monitor 566, computers often include other peripheral output devices (not shown) such as a printer and speakers, which may be connected through an output peripheral interface (not shown).

The computer 500 may operate in a networked environment using logical connections to one or more remote computers, such as a remote computer 572. The remote computer 572 may be a personal computer, a server, a router, a network PC, a peer device or other common network node, and typically includes many or all of the elements described above relative to computer 500. The logical connections depicted in FIG. 5 include a local area network (LAN) 574 and a wide area network (WAN) 576, but may also include other networks. Such networking environments are commonplace in offices, enterprise-wide computer networks, intranets, and global computer networks (e.g., the Internet).

When used in a local area networking environment, computer 500 is connected to the LAN 574 through a network interface or adapter 580. When used in a wide area networking environment, such as the Internet, computer 500 typically includes a modem 582 or other means for establishing communications over the WAN 576. The modem 582, which may be internal or external, is connected to system bus 508 via the user input interface 564, or other appropriate mechanism. In a networked environment, program modules depicted relative to computer 500, or portions thereof, may be stored in a remote memory storage device (not shown). By way of example, and not limitation, FIG. 5 illustrates remote application programs 584 as residing on the memory device. It will be appreciated that the network connections shown are exemplary and other means of establishing a communications link between the computers may be used.

Generally, the data processors of computer 500 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

Although described in connection with an exemplary computing system environment, including computer 500, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 500 executes computer-executable instructions such as those illustrated in FIG. 3. The invention manages metadata by maintaining database 108 of metadata records and generating a unique logical identifier for each of the metadata records. The metadata records each correspond to one or more media files 112 and contain information relating to content of the corresponding media files. Media files 112 are adapted for rendering by media player program 116 executed on one or more client computers 102. According to one embodiment of the invention, the logical identifiers are configured for use in querying the metadata database 108. The invention defines a base type corresponding to each of the logical identifiers, stores the logical identifiers and base types in ID registry 302, and defines associations between them. The base types are representative of the information contained in the respective metadata records for the corresponding logical identifiers.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of managing metadata comprising:

maintaining a database of metadata records, said metadata records each corresponding to one or more media files and containing information relating to content of the corresponding media files, said media files having associated physical identifiers based on physical properties of the media files and being adapted for rendering by a media player program executed on one or more client computers;

generating a unique logical identifier for each of the metadata records, said logical identifiers being configured for use in querying the metadata database. wherein said logical identifiers are independent of physical identifiers associated with said media files;

defining a base type corresponding to each of the logical identifiers, said base types being representative of the information contained in the respective metadata records for the corresponding logical identifiers;

storing the logical identifiers and the base types in an ID registry;

defining associations between the logical identifiers and the base types: and defining an associations table of the ID registry, said associations table having a schema containing a column for the logical identifiers and a column for source identifiers;

wherein at least a portion of the information relating to the content of the media files contained in the metadata records is provided by a third party data provider said third party data provider using provider identifiers for identifying the information, and further comprising mapping the logical identifiers to the provider identifiers in the ID registry.

2. The method of claim 1 wherein the source identifiers are representative of information selected from one or more of the following: provider identifiers and physical identifiers representative of physical characteristics of the media files.

3. The method of claim 1 wherein the associations table of the ID registry manages hierarchical associations.

4. A system for managing metadata comprising:

a server coupled to a data communications network;

a database of metadata records, said metadata records each corresponding to one or more media files having associated physical identifiers based on physical properties of the media files and containing information relating to content of the corresponding media files, said media files being adapted for rendering by a media player program executed on one or more client computers, said client computers being coupled to the data communications network; and an ID registry storing a unique logical identifier for each of the metadata records, said logical identifiers being configured for use by the server in querying the metadata database, wherein said logical identifiers are independent of physical identifiers associated with said media files, said ID registry further storing a base type corresponding to each of the logical identifiers and associated therewith in the ID registry, said base types being representative of the information contained in the respective metadata records for the corresponding logical identifiers;

wherein at least a portion of the information relating to the content of the media files contained in the metadata records is provided by a third party data provider, said third party data provider using provider identifiers for identifying the information, and wherein the logical identifiers are mapped to the provider identifiers in the ID registry; and wherein the ID registry includes an associations table, said associations table having a schema containing a column for the logical identifiers and a column for source identifiers.

5. The system of claim 4 wherein the source identifiers are representative of information selected from one or more of the following: provider identifiers and physical identifiers representative of physical characteristics of the media files.

6. The system of claim 4 wherein the associations table of the ID registry manages hierarchical associations.

7. One or more computer storage media having instructions stored thereon comprising:

a first field containing unique logical identifiers, said logical identifiers each corresponding to a metadata record, said metadata records each corresponding to one or more media files and containing information relating to content of the corresponding media files, said media files having associated physical identifiers based on physical properties of the media files and being adapted for rendering by a media player program executed on one or more client computers, said logical identifiers being configured for use in querying a metadata database, wherein said logical identifiers are independent of physical identifiers associated with said media files;

a second field containing base types associated with the logical identifiers, said base types each corresponding to one of the logical identifiers, said base types being representative of the information contained in the respective metadata records for the corresponding logical identifiers;

wherein at least a portion of the information relating to the content of the media files contained in the metadata records is provided by a third party data provider, said third party data provider using provider identifiers for identifying the information, and further comprising a third field containing provider identifiers, said logical identifiers being mapped to the provider identifiers; and wherein the fields define an associations table, said associations table having a schema containing a column for the logical identifiers and a column for source identifiers.

8. The data structure of claim 7 wherein the source identifiers are representative of information selected from one or more of the following; provider identifiers and physical identifiers representative of physical characteristics of the media files.

9. The data structure of claim 7 wherein the associations table manages hierarchical associations.

* * * * *